UNITED STATES PATENT OFFICE.

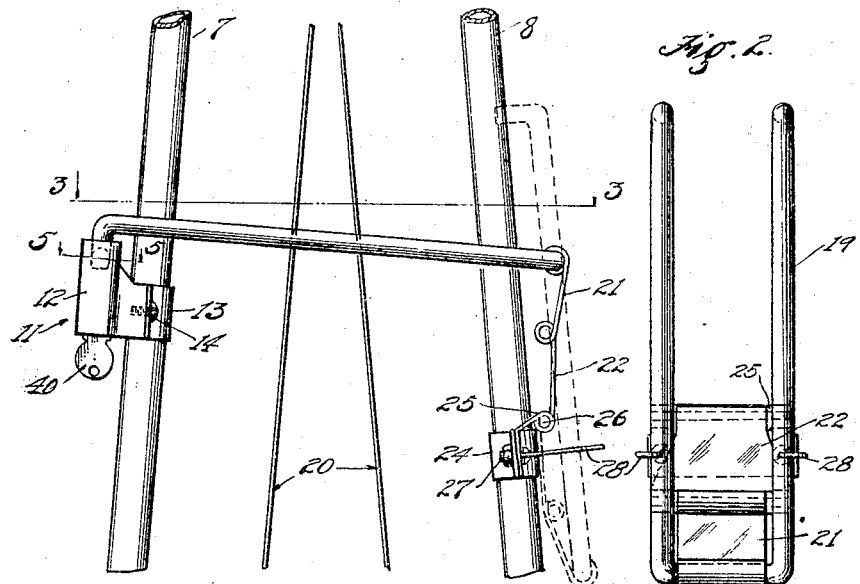

HOWARD LEROY PIPPEN, OF LOS ANGELES, CALIFORNIA.

CYCLE-LOCK.

1,197,852.  Specification of Letters Patent.  Patented Sept. 12, 1916.

Application filed November 30, 1914. Serial No. 874,650.

*To all whom it may concern:*

Be it known that I, HOWARD L. PIPPEN, a citizen of the United States, residing at Los Angeles, in the county of Los Angeles, State of California, have invented new and useful Improvements in Cycle-Locks, of which the following is a specification.

This invention relates to a cycle lock.

It is the object of this invention to provide a cycle lock which is adapted to be permanently attached to the cycle frame, and which is so constructed and arranged that it can not be removed from the cycle frame when in its locked position without severing the hasp thereby preventing the lock being rendered ineffectual by malicious removal of the lock or hasp from the cycle frame.

Another object is to provide a pivotal mounting for the hasp or shackle which will permit of its being attached to cycle frame forks of different dimensions and thereby adapting the device for universal use, and whereby when the hasp is pivotally attached to one member of the cycle frame fork and extended astride a wheel spoke and the other member of the cycle fork it will register with hasp receiving sockets in a lock rigidly mounted on the cycle frame.

Another object is to provide means for holding the pivoted hasp against movement when in its disengaged position.

A further object is to provide a single key controlled mechanism adapted to engage both terminals of a U-shaped hasp.

The invention is illustrated in the accompanying drawing, in which:

Figure 1 is a view in elevation of a portion of the forks of a cycle frame illustrating the invention as applied and showing the manner of engaging the wheel spokes to lock the cycle against use; the position of the hasp when not in use being indicated in dotted lines. Fig. 2 is a view in elevation of a hasp as disposed in its inoperative position. Fig. 3 is a horizontal section and plan view on the line 3—3 of Fig. 1. Fig. 4 is a detail in perspective of the rear portion of a bicycle illustrating the invention as applied. Fig. 5 is an enlarged detail horizontal section of the lock as seen on the line 5—5 of Fig. 1 in the direction indicated by the arrows illustrating the manner of locking the terminals of the hasp.

More specifically, 7 and 8 indicate the upwardly extending members of a bicycle fork 9 on which the cycle wheel 10 is revolubly mounted; the members 7 and 8 extending on the opposite sides of the wheel 10 in the usual manner as illustrated in Fig. 4.

In carrying out the present invention a lock 11 of any suitable type is rigidly mounted on the fork member 7; the lock 11 being here shown as comprising a tumbler lock of the Yale type having a casing 12 which is secured in place on the member 7 by means of a strap 13 which extends around the inner face of the member 7 and is secured to the lock case 12 by means of screws 14 in such manner as to dispose the lock case 12 on the outer face of the member 7 in rigid engagement therewith.

The lock case 12 is fitted with a pair of spaced openings 15 and 16 on its upper end which are adapted to receive the downturned terminations 17 and 18 of a U-shaped hasp or shackle 19 which is adapted to extend on the opposite sides of the fork members 7 and 8 astride of one or more of the wheel spokes 20. The hasp 19 is designed to be permanently attached to the member 8 in pivotal connection therewith; this connection comprising a pair of pivotally connected links 21 and 22 which are interposed between the connecting portion 23 of the hasp 19 and a clamp 24 secured to the member 8. The link 21 is pivotally connected to the hasp portion 23 and the link 22 is pivotally connected to a pair of spaced ears 25 on the clamp 24 by means of a pivot pin 26.

The clamp 24 consists of a pair of plates arranged on opposite sides of the member 8 which are connected together by means of screws 27 and mounted on the outermost plate of the clamp 24 is a pair of spaced spring clips 28 which are adapted to engage the side portions of the hasp when the latter are disposed vertically parallel with the member 8 as illustrated in dotted lines in Fig. 1 and full lines in Fig. 2.

The links 21 and 22 form a pivotal connection which will permit the hasp 19 being raised and lowered and advanced and retracted on its pivotal connection with the fork member 8 so that the downturned terminations 17 and 18 may be readily directed into the openings 15 and 16 in the lock case 12.

Mounted in the lock case 12 is a pair of laterally movable keepers 29 and 30 which are spaced apart and have a spring 31 interposed therebetween to normally maintain the keepers in their outermost positions with their outer edges disposed approximately half way across the openings 15 and 16 in the upper end of the lock case. The upper face of the keepers 29 and 30 are rounded at their outer edges 32 to form inclined faces adapted to be engaged by the ends of the hasp 19 when the latter are introduced into the openings 15 and 16 and retracted in opposition to the spring 31.

The downturned terminations 17 and 18 of the hasp 19 are formed with notches 33 adapted to receive the keepers 29 and 30 which spring into engagement with the notches 33 when the terminations 17 and 18 have been introduced sufficiently far into the lock case.

The keepers 29 and 30 are designed to be retracted in opposition to the spring 31 by operation of the cylinder of the lock 11; the operation of the keepers 29 and 30 being here shown as effected by means of links 35 and 36 connecting the opposite sides of the center of the lock cylinder 37 with longitudinally extending slots 38 in the keepers 29 and 30; a partial rotation of the lock cylinder 37 operating to retract the keepers 29 and 30.

The links 35 and 36 are connected to the keepers 29 and 30 by means of pins 39 which engage the inner ends of the slots 38; this slotted connection between the keepers 29 and 30 and the links 35 and 36 permitting of the retraction of the keepers independent of the lock cylinder 37 on the insertion of the terminations of the hasp into the lock casing.

In the operation of the invention, the hasp 19 is normally disposed as indicated in dotted lines in Fig. 1, and full lines in Fig. 2 when not employed to lock the cycle; the hasp 19 being retained in this position by reason of the engagement of the spring clips 28 therewith. When it is desired to lock the cycle the hasp 19 is elevated and rocked on the pivotal connections of the links 21 and 22 and is moved astride of the fork members 7 and 8 and one or more of the cycle wheel spokes 20.

The downturned terminations 17 and 18 are then introduced into the apertures 15 and 16 where they are engaged by the keepers 29 and 30 as particularly shown in Fig. 5, thus locking the hasp 19 which by reason of its engagement with the spokes 20 of the cycle wheel will effectively lock the cycle against use. To disengage the keeper 29 the lock cylinder 37 is operated as before described by means of a key 40 as is common to the cylinder locks, whereupon the hasp 19 may be rocked on its pivotal connections and restored to its inoperative position.

What I claim is:

1. A bicycle lock comprising the combination with a bicycle frame yoke and a spoked wheel on said frame, of a lock rigidly mounted on one of the members of the yoke, a U-shaped hasp adapted to extend astride the yoke members and the spoke of the wheel and to be engaged at its outer end by the lock, and means for pivoting the hasp whereby its pivoted end may be adjusted vertically or horizontally.

2. A bicycle lock comprising the combination with a bicycle frame yoke and a spoked wheel on said frame, of a lock pivotally mounted on one of the members of the yoke, a U-shaped hasp adapted to extend astride the yoke members and the spoke of the wheel and to be engaged at its outer end by the lock, a link connected to the hasp, and a second link pivoted to one of the yoke members and pivotally connected to the other link.

3. A cycle lock comprising the combination with a cycle frame yoke, and a spoked wheel extending between the members of the yoke, of a lock rigidly mounted on one of the yoke members, having a pair of hasp-receiving apertures on its upper face, a U-shaped hasp having down-turned ends, said hasp adapted to extend astride the yoke members and the spoke of the wheel, with its down-turned ends extending into the apertures in the lock, and means for pivoting the hasp to the other yoke member for vertical or horizontal movement in relation thereto.

4. A cycle lock comprising the combination with a cycle frame yoke and a spoked wheel extending between the members of the yoke, of a lock rigidly mounted on one of the yoke members, having a pair of hasp-receiving apertures on its upper face, a U-shaped hasp having down-turned ends, said hasp adapted to extend astride the yoke members, and the spoke of the wheel, with its down-turned ends extending into the apertures in the lock, and means for pivoting the hasp to the other yoke member for vertical or horizontal movement in relation thereto, said means including a pair of horizontally connected links, one of which is pivoted to the cycle frame yoke and the other to the connecting portion of the U-shaped hasp.

5. A cycle lock comprising the combination with a cycle frame yoke and a spoked wheel extending between the members of the yoke, of a lock rigidly mounted on one of the yoke members, having a pair of hasp receiving apertures on its upper face, a U-shaped hasp having down-turned ends, said hasp adapted to extend astride the yoke members and the spoke of the wheel, with its down-turned ends extending into the apertures in the lock, means for pivoting the hasp to the other yoke member for vertical or horizontal movement in relation thereto, said means including a pair of horizontally connected links, one of which is pivoted to the cycle frame yoke and the other to the connecting portion of the U-shaped hasp, and means engageable with the hasp when in its unlocked position to hold it against movement on its pivotal mounting.

In witness that I claim the foregoing I have hereunto subscribed my name this 14th day of November, 1914.

HOWARD LEROY PIPPEN.

Witnesses:
 EDMUND A. STRAUSE,
 MARGUERITE BATES.

Copies of this patent may be obtained for five cents each, by addressing the "Commissioner of Patents, Washington, D. C."